(No Model.)
J. A. SNEE.
METHOD OF AND APPARATUS FOR REGULATING THE TEMPERATURE OF A SUBSTANCE PASSING THROUGH A LINE OF PIPING.
No. 338,447. Patented Mar. 23, 1886.
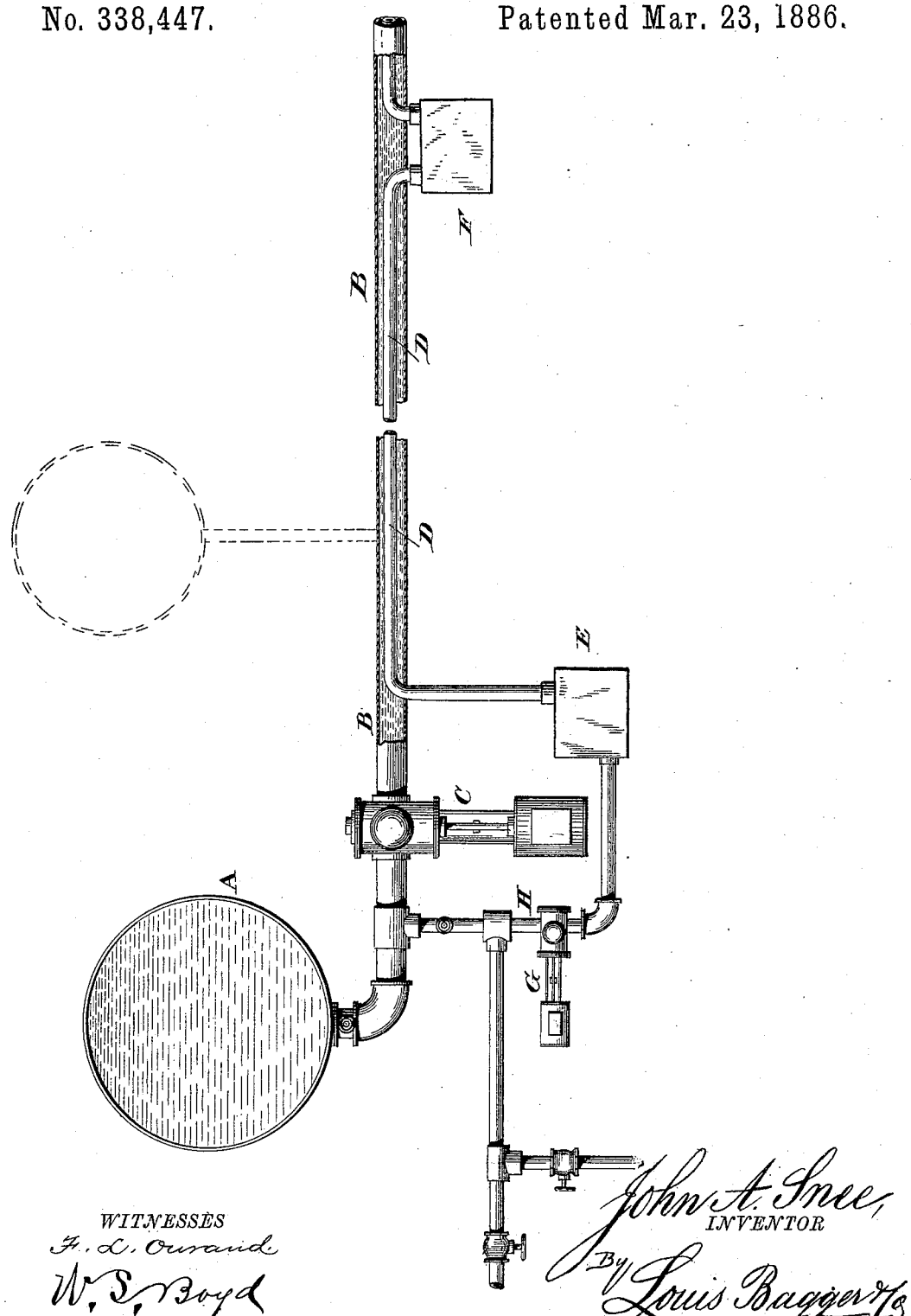
WITNESSES
F. L. Ourand
W. S. Boyd
John A. Snee,
INVENTOR
By Louis Bagger & Co
Attorneys

UNITED STATES PATENT OFFICE.

JOHN A. SNEE, OF WEST ELIZABETH, PENNSYLVANIA.

METHOD OF AND APPARATUS FOR REGULATING THE TEMPERATURE OF A SUBSTANCE PASSING THROUGH A LINE OF PIPING.

SPECIFICATION forming part of Letters Patent No. 338,447, dated March 23, 1886.

Application filed January 22, 1886. Serial No. 189,432. (No model.)

*To all whom it may concern:*

Be it known that I, JOHN A. SNEE, a citizen of the United States, and a resident of West Elizabeth, in the county of Allegheny and State of Pennsylvania, have invented certain new and useful Improvements in Regulating the Temperature of a Substance Passing Through a Line of Piping; and I do hereby declare that the following is a full, clear, and exact description of the invention, which will enable others skilled in the art to which it appertains to make and use the same, reference being had to the accompanying drawing, which forms a part of this specification, and in which a plan view is shown of a line of piping embodying the principles of my invention.

My improvement relates to methods of conveying substances through a system of tubes or piping, and has for its object to regulate the temperature of said substances throughout the entire distance which it passes.

With these ends in view the invention consists in the method of and apparatus for regulating the temperature of a substance passing through a line of piping, as will be hereinafter described, and more particularly pointed out in the claims.

Referring to the accompanying drawing, A represents a common oil-tank, in which the oil is stored, and B represents a pipe through which it is conveyed.

C is a common force-pump connected to the pipe B for forcing the oil through it at the desired speed.

D represents a pipe passing longitudinally through the center of the pipe B, and through which passes the medium by means of which the temperature of the substance in the conducting-pipe is regulated. Suitable supports are provided at the requisite distances apart for keeping the pipe D in the center of the pipe B.

E and F are stations along the line of piping for regulating the temperature of the medium which passes through the pipe D. At each of these stations the pipe D passes through the sides of the pipe B, through a suitable heating-furnace, and back through the side of the pipe B, and along the center of it to the next station, where it is again taken out and passed through another heating-furnace. A suitable force-pump, G, at the end of the pipe D, forces a continuous current or stream of the medium which has the desired temperature through the pipe to the other end, where it is allowed to escape.

H represents supply-pipes for the pump G, and which may be connected to a well of water, or to the pipe B, or with the atmosphere, according to what it is desired to force through the pipe D. All of these pipes are supplied with suitable valves for regulating the flow of the various substances through them.

It is well known that in long lines of pipe a slight change of temperature is sufficient to cause the pipe to increase so much in length as to crook or bulge, or to contract so much as to cause it to pull apart at the joints and permit the contents to escape. Where such pipes are used for transporting oil or crude petroleum, the oil rapidly loses its temperature after leaving the tank, where it is kept at a uniform temperature by suitable means, and as the temperature of the oil decreases it renders it stiff and sluggish, and also causes the paraffine and other substances which are contained in it to condense and collect upon the interior of the pipe, thus decreasing its carrying capacity very considerably. To overcome these disadvantages, the pipes heretofore have been buried in trenches in the ground or covered with a non-conducting material, both of which means are costly, and neither of which is satisfactory.

I have discovered that the desired object can be accomplished by forcing a current of air through any suitable heating-furnace until it acquires the desired temperature, and then passing it through a suitable pipe to the interior or exterior of the conducting-pipe, as desired, and passing it along the line of pipe. As the oil and air thus pass along side by side, the oil is constantly taking the temperature from the air until it becomes necessary to reheat the air, which is done by passing the interior pipe through the sides of the conveying-pipe, and through another heating-furnace similar to the one it passed through at first, and then back into the interior of the conveying-pipe. The heat is again taken from it by the oil, and it is again supplied by another furnace until the destination of the oil has been reached, when the air is allowed to pass out of the end of the pipe.

In summer the oil can be cooled by passing a current of cold air through the interior pipe and by using a refrigerator at each station instead of a heating-furnace. It may also be necessary in extremely long pipes to place an additional force-pump at the intermediate stations to assist in forcing the air through the pipe and furnaces; or the air may be allowed to pass off at each station and a fresh supply forced through the furnaces and pipes.

It is evident that my method can be applied to the conveyance of gas, water, or other substances as well as oil. To adapt it for use in conveying gas, it is only necessary to connect the end of the conveying-pipe with the mouth of the well or reservoir, if one be used, and to provide it with the ordinary means for preventing leakage at the joints, and regulating the pressure along the line of pipe. It is also evident that water or steam can be used for regulating the temperature as well as air, it only being necessary to supply the force-pump with the required substance, and, if it is desired, the same material can be used for regulating the temperature as is being conveyed through the main pipe. To accomplish this, it is only necessary to connect the supply-pipe of the pump on the regulating-pipe with the conducting-pipe, and thus take the material out of the conducting-pipe, and pass it through the furnaces and regulating-pipe to the end of the line, where it can be discharged into the common reservoir.

Way stations or reservoirs can be supplied with the substance being conveyed by means of a branch line connected to the main line, and the temperature in the branch regulated by making a branch to the regulating-pipe and passing it along with the branch of the conveying-pipe. If it is desired, two or more substances can be conveyed along the same line of piping by inclosing a sufficient number of pipes within each other, and passing each substance through its appropriate pipe, the regulating medium occupying either of them, as desired.

Each of the heating-stations can be in the care of an assistant, who will keep the furnaces supplied with the necessary amount of fuel, and also care for the pipe nearest to his station. It will thus be seen that the entire line of piping can be regulated at will, and the temperature at any intermediate point changed as required to keep the oil moving, and to keep the pipe from expanding or contracting so much as to damage it.

Having thus described my invention, I claim and desire to secure by Letters Patent of the United States—

1. The method of regulating the temperature of a substance passing through a line of piping by means of a medium having the required temperature passing through a pipe passing longitudinally through sections of the line of piping, and through devices at the ends of the sections, substantially as described, for imparting to the regulating medium the required temperature, substantially as shown and described.

2. The combination of a line of piping, a pipe extending longitudinally through the interior of sections of said line of piping, and through temperature-regulating devices, substantially as described, a force-pump connected with the line of piping for forcing the desired substance through it, and another force-pump connected with the interior pipe for forcing another substance having the desired temperature through it, substantially as and for the purpose set forth.

3. The combination of a line of piping, a pipe connected at one end with the interior of said line of piping and passing through a temperature-regulating device and through the interior of sections of said line of piping, and through other temperature-regulating devices at the ends of the sections similar to the first one and substantially as described, and a force-pump connected with the interior pipe between the point where it is connected with the line of piping and the first temperature-regulating device, as shown and described.

In testimony that I claim the foregoing as my own I have hereunto affixed my signature in presence of two witnesses.

JOHN A. SNEE.

Witnesses:
EMMA M. GILLETT,
W. S. BOYD.